US010178694B2

(12) United States Patent
Ghosh et al.

(10) Patent No.: US 10,178,694 B2
(45) Date of Patent: Jan. 8, 2019

(54) RANDOM ACCESS WITH CARRIER SENSING

(71) Applicant: Intel IP Corporation, Santa Clara, CA (US)

(72) Inventors: Chittabrata Ghosh, Fremont, CA (US); Po-Kai Huang, West Lafayette, IN (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 89 days.

(21) Appl. No.: 15/280,486

(22) Filed: Sep. 29, 2016

(65) Prior Publication Data

US 2017/0257887 A1 Sep. 7, 2017

Related U.S. Application Data

(60) Provisional application No. 62/301,683, filed on Mar. 1, 2016.

(51) Int. Cl.
*H04W 74/08* (2009.01)
*H04W 72/04* (2009.01)

(52) U.S. Cl.
CPC ... *H04W 74/0808* (2013.01); *H04W 72/0453* (2013.01)

(58) Field of Classification Search
None
See application file for complete search history.

(56) References Cited

U.S. PATENT DOCUMENTS

2012/0207074 A1* 8/2012 Kneckt ............ H04W 74/0816
370/312
2015/0201434 A1* 7/2015 Fang ................ H04W 74/0816
370/335
(Continued)

FOREIGN PATENT DOCUMENTS

GB       2543584 A  *  4/2017
WO   WO-2015020377 A1   2/2015
(Continued)

OTHER PUBLICATIONS

"International Application Serial No. PCT/US2017/015371, International Search Report dated May 11, 2017", 3 pgs.
(Continued)

*Primary Examiner* — Jeffrey M Rutkowski
*Assistant Examiner* — Andre Tacdiran
(74) *Attorney, Agent, or Firm* — Schwegman Lundberg & Woessner, P.A.

(57) ABSTRACT

Computing readable media, apparatuses, and methods for random access with carrier sensing are disclosed. An apparatus is disclosed including processing circuitry configured to: decrement a value of an orthogonal frequency division multiple-access (OFDMA) backoff (OBO) field based on a number of the resource units (RUs) indicated for random access in a trigger frame. The processing circuitry may be further configured to: when the value of the OBO field reaches a predetermined value, randomly select one of the RUs indicated for random access and determine a virtual carrier sense (CS) based on one or more network allocation vectors (NAVs) and perform a physical CS on the selected RU, and if the virtual CS and the physical CS both indicate that the selected RU is idle, transmit a physical (PHY) layer convergence procedure (PLCP) protocol data units (PPDU) on the selected RU in accordance with OFDMA.

19 Claims, 13 Drawing Sheets

(56) References Cited

U.S. PATENT DOCUMENTS

| | | | |
|---|---|---|---|
| 2015/0327225 A1 | 11/2015 | Xia et al. | |
| 2016/0044533 A1 | 2/2016 | Seok | |
| 2016/0128024 A1* | 5/2016 | Frederiks | H04W 72/04 370/329 |
| 2016/0366701 A1* | 12/2016 | Chu | H04W 74/0816 |
| 2017/0064708 A1* | 3/2017 | Noh | H04W 74/0816 |
| 2017/0118770 A1* | 4/2017 | Cherian | H04W 74/08 |
| 2017/0202016 A1* | 7/2017 | Itagaki | H04W 74/08 |
| 2017/0367118 A1* | 12/2017 | Choi | H04W 74/0816 |
| 2018/0035488 A1* | 2/2018 | Yang | H04W 84/12 |

FOREIGN PATENT DOCUMENTS

| | | |
|---|---|---|
| WO | WO-2015199518 A1 | 12/2015 |
| WO | WO-2016018026 A1 | 2/2016 |

OTHER PUBLICATIONS

"International Application Serial No. PCT/US2017/015371, Written Opinion dated May 11, 2017", 6 pgs.

* cited by examiner ured US 10,178,694 B2

RANDOM ACCESS WITH CARRIER SENSING

PRIORITY CLAIM

This application claims the benefit of priority under 35 USC 119(e) to U.S. Provisional Patent Application Ser. No. 62/301,683, filed Mar. 1, 2016, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to random access of resource units (RUs) with carrier sensing. Some embodiments relate to methods, computer readable media, and apparatus for random access with carrier sensing.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
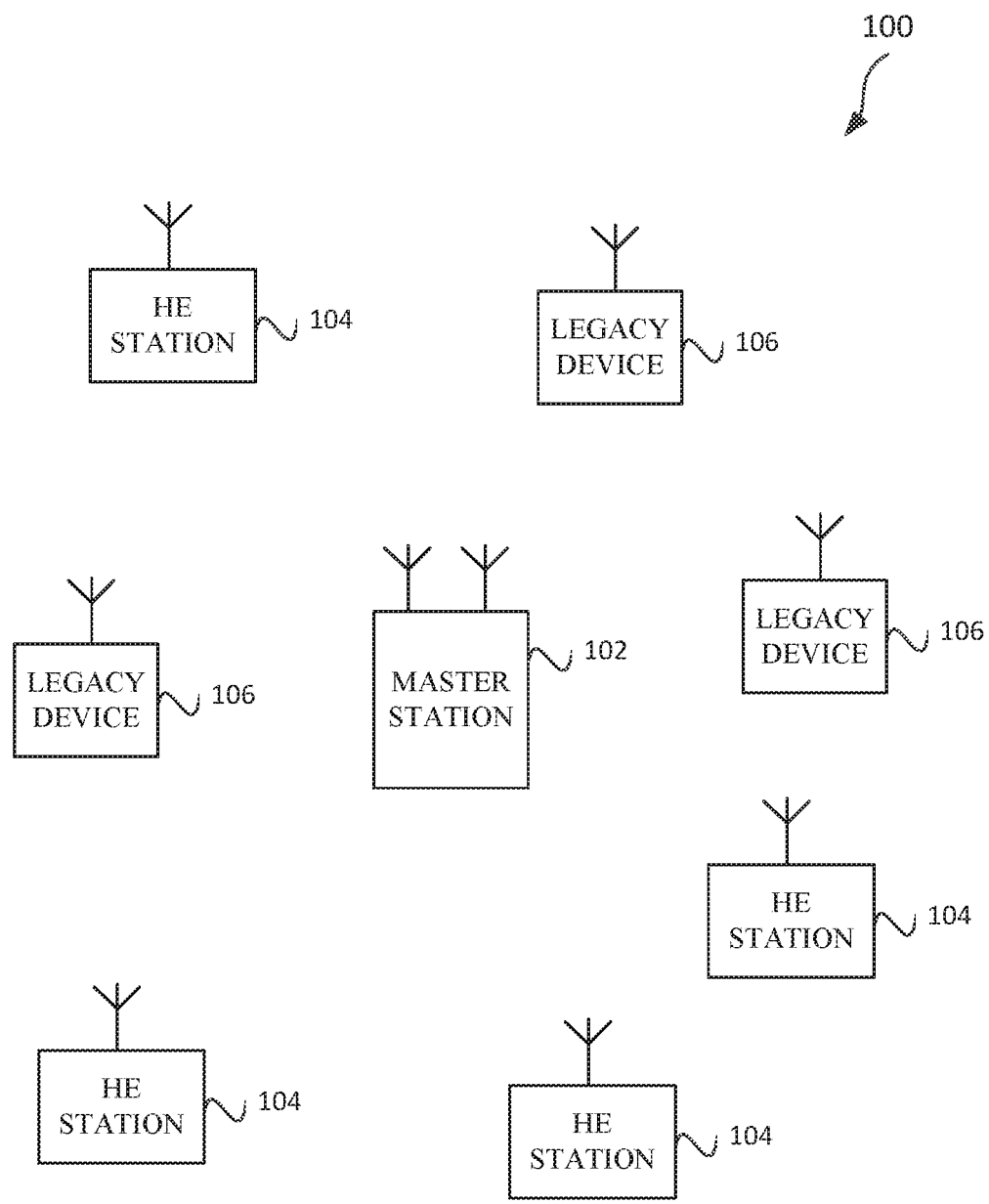
FIG. 1 illustrates a WLAN in accordance with some embodiments.

FIG. 1 illustrates a WEAN 100 in accordance with some embodiments. The WEAN 100 may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU).

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.251 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

A HE frame may be configured for transmitting a number of spatial streams, which may be in accordance with MU-MIMO and may be in accordance with OFDMA. In other embodiments, the master station 102 HE STA 104, and/or legacy device 106 may also implement different technologies such as code division multiple access (CDMA) 2000, CDMA 2000 1×, CDMA 2000 Evolution-Data. Optimized (EV-DO), Interim Standard 2000 (IS-2000), Interim Standard 95 (IS-95), interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g. IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc.

In example embodiments, the HE station 104 and/or the master station 102 are configured to perform the methods and functions described herein in conjunction with FIGS. 1-13.

Figure 2:
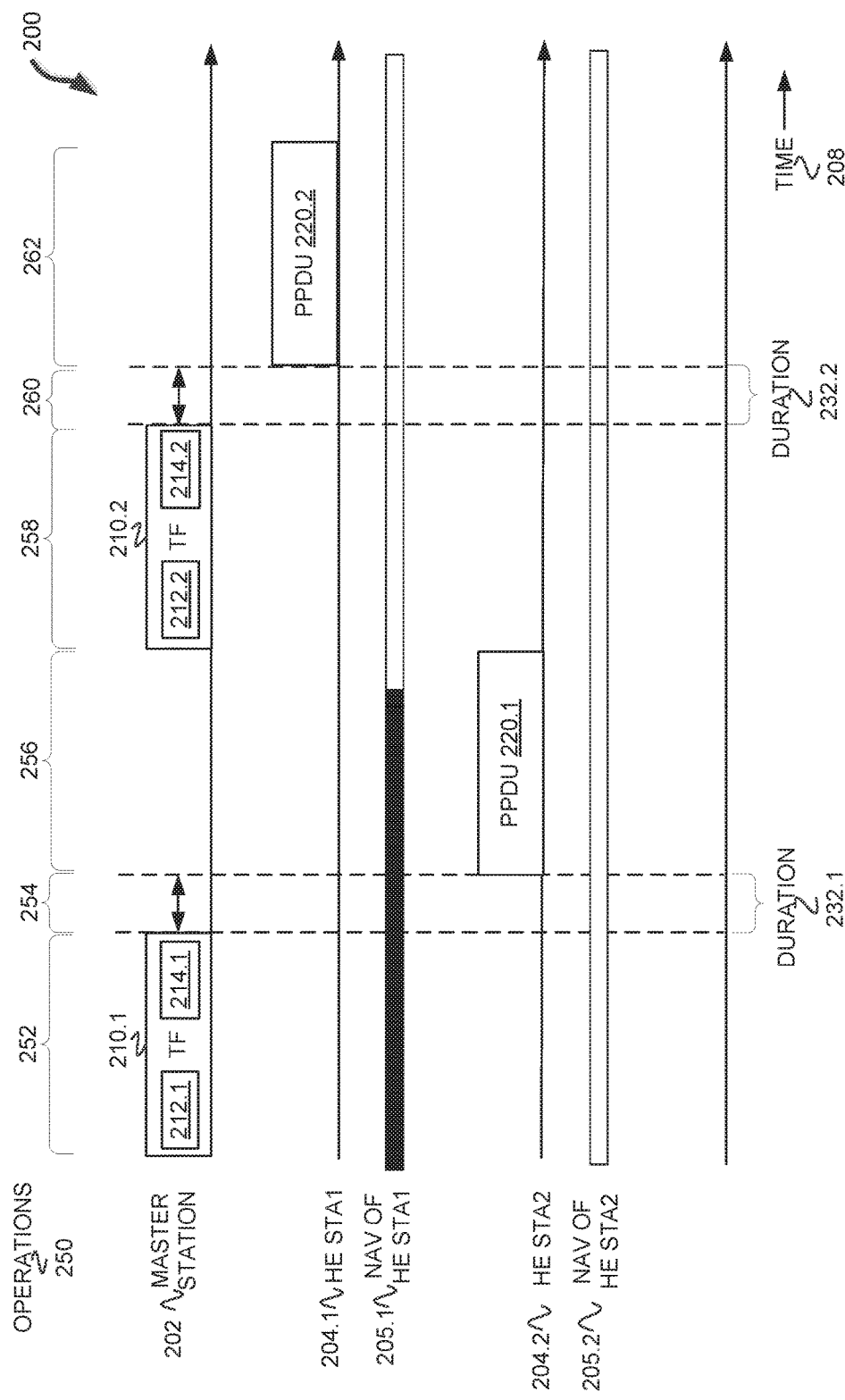
FIG. 2 illustrates a method of random access with carrier sensing in accordance with some embodiments.
Figure 3:
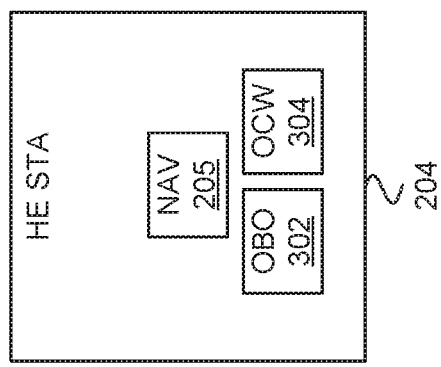
FIG. 3 illustrates a HE STA in accordance with some embodiments.

FIG. 2 illustrates a method 200 of random access with carrier sensing in accordance with some embodiments. Illustrated in FIG. 2 is master station 202, network allocation vector (NAV) of HE STAs 205, HE STAs 204, time along a horizontal axis, and operations 250 along the top. The master station 202 may be the same or similar as the master station 102 of FIG. 1. The HE STAs 204 may be the same as similar as the HE stations 104 of FIG. 1. A clear NAV of HE STA2 205.2 indicates the NAV of HE STA2 205.2 is not set, and a dark NAV of HE STA1 205.1 indicates the NAV of HE STA1 205.1 is set. FIG. 3 will be disclosed in conjunction with FIG. 2.

FIG. 3 illustrates a HE STA 204 in accordance with some embodiments. Illustrated in FIG. 3 is HE STA 204, which comprises NAV 205, OFDMA Backoff (OBO) 302, and OFDMA Contention Window (OCW) 304.

The NAV of HE STA 204 may be a NAV of HE STA 204. HE STA 204 may include multiple NAVs in accordance with some embodiments. The OBO 302 may be a backoff count that indicates a number of slot times. In some embodiments, the duration of the slot time may be defined by a wireless communication standard. In some embodiments, the duration of the slot time is 9 μs. The OBO 302 may be determined as a pseudo-random integer from zero to OCW 304.

The OCW 304 may be an integer from which the OBO 302 is determined. The OBO 302, in some embodiments, is not permitted to be greater than the OCW 304. In some embodiments, the OBO 302 and OCW 304 may be for using random access resource units (RU). In some embodiments, the master station 204 comprises one or more NAVs 205, an OBO 302, and an OCW 304. A size of the OCW 304 may be indicated by the master station 102. OCW 304 may include an OCW minimum (min) which is a minimum value of the OCW 304.

Returning to FIG. 2, the method 200 begins with a master station 102 transmitting a trigger frame (TF) 210.1. In some embodiments, the trigger frame 210 comprises a carrier sense (CS) indication 212.1 and resource allocation 214.1. In some embodiments, the TF 210.1 may be referred to as a TF for random access. The CS indication 212.1 indicates whether the HE STA 104 should consider the one or more NAVs 205 and/or a physical CS of the wireless medium before transmitting in a RU for random access. In some embodiments, the resource allocation 214.1 is a resource allocation for UL OFDMA. In some embodiments, the resource allocation 214.1 comprises an indication of RUs for random access. In some embodiments, the RU may indicate a bandwidth range (or number of data tones or data sub-carriers) for a HE STA 104 to transmit on. The resource allocation 214.1, in some embodiments, indicates a number of RUs for random access. In some embodiments, the master station 102 may assign RUs to the number of RUs for random access. In some embodiments, the RUs for random access may be termed a set of RUs.

As illustrated in FIG. 2, the CS indication 212.1 indicates that the CS is required before responding to the TF 210.1. In some embodiments, the CS indication 212.1 indicates that the HE STA 204 is required to sense the medium before an UL MU transmission in response to a TF. In some embodiments, the CS indication 212.1 indicates that the HE STA 204 is to determine whether the NAV of HE STA 205 (virtual CS) indicates that the HE STA 204 can respond to the TF 210.1, and then, if the NAV of HE STA 205 indicates that the HE STA 204 can respond to the TF 210.1, determine whether the wireless medium (physical CS) indicates that the HE STA 204 can respond to the TF 210.1.

HE STA1 204.1 may determine that CS indication 212.1 indicates that the CS is required before responding to the TF 210.1. HE STA 1 204.1 determines that the NAV of HE STA 1 205.1 indicates that HE STA 1 205.1 is set and that the HE STA 1 205.1 is to defer and not respond. In some embodiments, the HE STAs 204 are configured to determine how the NAV of the HE STA 205 was set to determine whether the NAV of the HE STA 205 indicates that the HE STA 204 should not respond to the TF 210.1. In some embodiments, HE STAs 204 are configured to determine that the NAV of HE STAs 205 does not indicate that they may not respond to the TF 210.1 if the NAV of HE STAs 205 is set by the master station 202 that sent the TF 210.1. In some embodiments, HE STAs 204 are configured to determine that the NAV of HE STAs 205 does not indicate that they may not respond to the TF 210.1 if the PPDU 220.1 that the HE STAs 204.1 intends to transmit is an acknowledgment or a block acknowledgments and it has a duration below a threshold. In some embodiments, HE STAs 204 are configured to determine that the NAV of HE STAs 205 does not indicate that they may not respond to the TF 210.1 if the NAV of HE STAs 205 is set by a frame originating from an intra-BSS HE station 104, a master station 102, or a legacy device 106.

Since the NAV of HE STA1 205.1 is set, in some embodiments, HE STA 1 205.1 is configured to not decrement OBO 302. HE STA1 205.1 may attempt to transmit on a RU for random access at a next trigger frame, e.g., trigger frame 210.2.

In some embodiments, if the CS indication 212.1 indicates that the CS is required before responding to the TF 210.1, then the HE STAs 104 performs a physical sense of the wireless medium. In some embodiments, the physical sense is an energy detect (ED). In some embodiments, the physical sense is signal detect.

In some embodiments, the HE STAs 104 are configured to perform the physical sense after receiving the TF 210. In some embodiments, the HE STAs 204 are configured to perform ED at least in the sub-channel that includes the RU that the HE STA 204 transmits on. For example, in some embodiments, a HE STA 204 is configured to perform ED at least on the sub-channel that contains the RU that the HE STA 204 intends to transmit on, where the sub-channel is either a single 20 MHz channel or multiple 20 MHz channels. In some embodiments, if sub-channel indicates the medium is busy, then the HE STA 204 does not transmit on the RU.

Returning to operation 252, HE STAs 204 receive the TF 210.1. The method 200 continues with operation 254, which may be a duration (e.g., short interframe space, SIFS) before the HE STAs 204 are to begin transmitting responses to the trigger frame 210.1. During operation 254, the HE STAs 204 may be configured to determine whether they are going to respond, and, if they are going to respond, an RU for random access to respond on. The method 200 continues with operation 256 where the HE STAs 204 transmit if the HE STAs 204 determine to transmit. Operation 254 and 256 are disclosed in conjunction with one another.

In some embodiments, HE STA2 204.2 determines that the NAV of STA 205.2 does not indicate that the HE STA2 204.2 cannot transmit. If NAV of STA 205.2 indicates idle and this is an initial transmission, then HE STA2 204.2 may initialize OBO 302 by selecting a value in the range of 0 and OCW 304, which may be selected randomly, in accordance with some embodiments.

Figure 4:
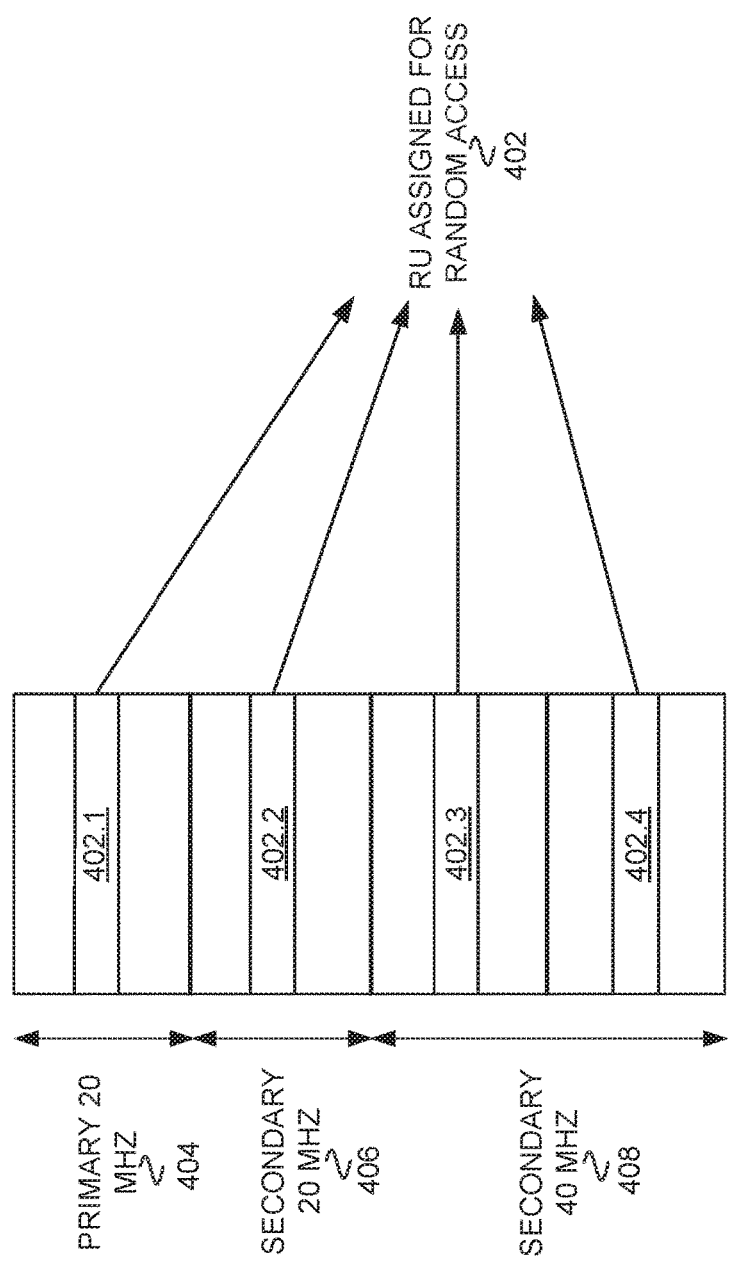
FIG. 4 illustrates RU assigned for random access in accordance with some embodiments.
Figure 5:
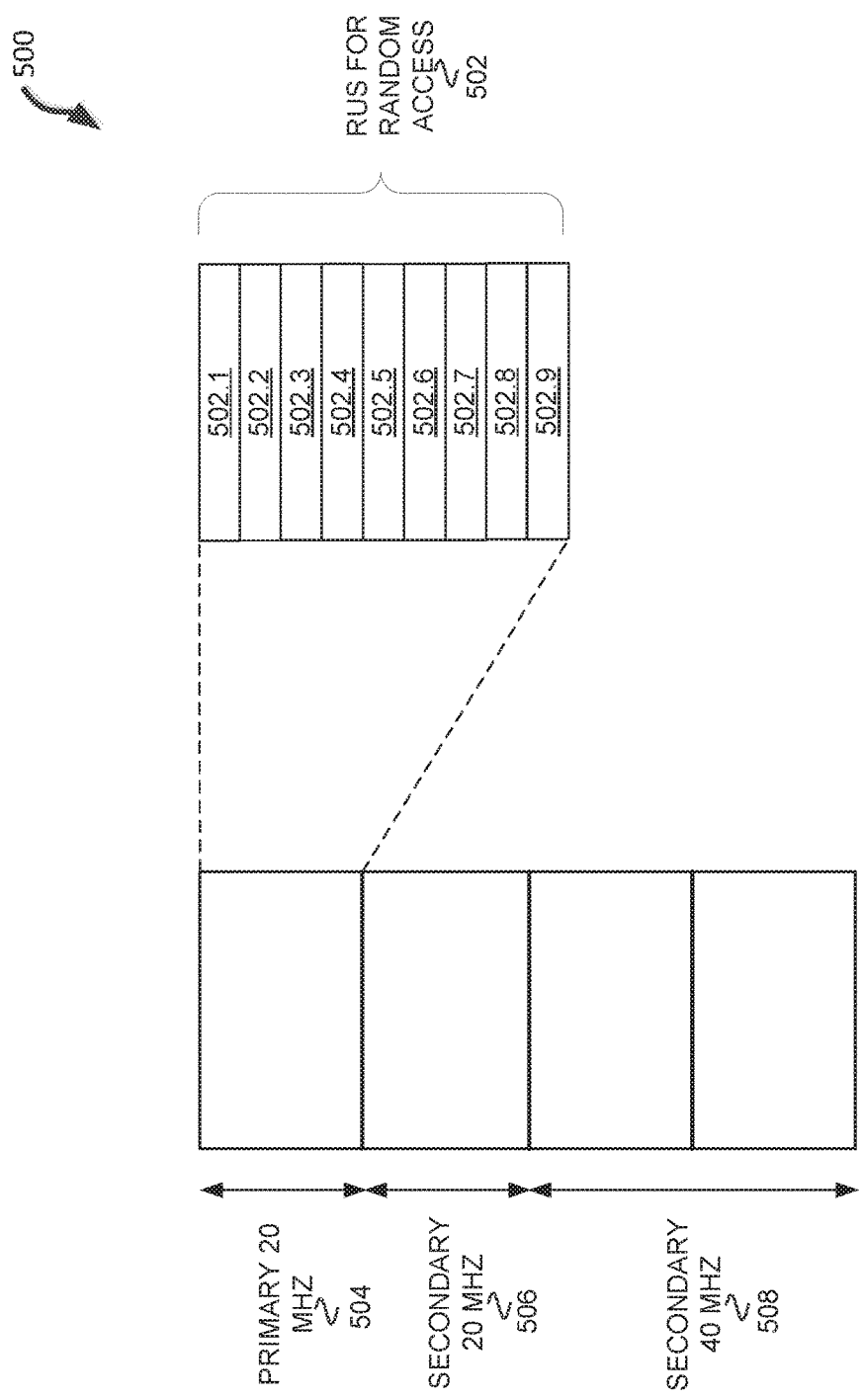
FIG. 5 illustrates RU assigned for random access in accordance with some embodiments.

In some embodiments, HE STA2 204.2 may perform a physical sense of the medium. For example, FIGS. 4 and 5 are disclosed in conjunction with FIGS. 2 and 3. FIG. 4 illustrates RU assigned for random access 410 in accordance with some embodiments. Illustrated in FIG. 4 is primary 20 MHz channel 404, secondary 20 MHz 406 channel, secondary 40 MHz channel 408, and RU assigned for random access 410. The RUs assigned for random access 410 may be a portion of a 20 MHz channel or one or more 20 MHz channels. FIG. 5 illustrates RU assigned for random access 502 in accordance with some embodiments. Illustrated in FIG. 5 is primary 20 MHz channel 504, secondary 20 MHz 506 channel, secondary 40 MHz channel 508, and RU assigned for random access 502. The RUs assigned for random access 502 may be a portion of a 20 MHz channel or one or more 20 MHz channels. In some embodiments, the master station 202 is configured to make each of the RU for random access indicated in resource allocation 214 a same size. In some embodiments, the same size may be indicated to the HE STAs 204 in a previous packet (e.g., a beacon), may be indicated by a wireless communications standard, e.g., IEEE 802.11, or may be indicated in the TF 210. The HE STAs 204 may be able to prepare a PPDU before choosing a RU for random access due to the same size. In some embodiments, the master station 202 may be configured to divide a bandwidth into a number of RUs for random access. For example, primary 20 MHz 504 divided into nine RUs for random access 502.

In some embodiments, HE STA2 204.2 decrements OBO 302 equal to the number of RUs for random access indicated in resource allocation 214.1. In some embodiments, if OBO 302 equals 0, and there is at least one RU for random access and indicated idle by a physical CS, then HE STA2 204.2 randomly selects any one of the RUs (which are indicated as idle by a physical CS) for random access, and transmits UL PPDU 220.2 on the selected RU. In some embodiments, HE STA2 204.2 may select more than one RU.

For example, referring to FIG. 4, HE STA2 204.2 may perform a physical sense (e.g. ED) and determine that secondary 40 MHz 408 indicates busy, but that primary 20 MHz 404 and secondary 20 MHz 406 indicate idle. So, HE STA2 204.2 decrements OBO 302 by two (for 402.1 and 402.2), and if OBO 302 is zero, then HE STA2 204.2 transmits PPDU 220.1 on 402.1 or 402.2. In some embodiments, STA2 204.2 randomly selects between 402.1 and 402.2. As another example, referring to FIG. 5, HE STA2 204.2 may perform physical sense (e.g., ED) and determine that primary 20 MHz channel is idle. So, HE STA2 204.2 decrements OBO 302 by nine (for 502.1 and 502.9), and if OBO 302 is zero (OBO does not go negative), then HE STA2 204.2 transmits PPDU 220.1 on one of 502.1 through 502.9. In some embodiments, STA2 204.2 randomly selects between 502.1 through 502.9.

In some embodiments, HE STA2 204.2 is configured to decrement OBO 302 with a number of RU for random access indicated in the resource allocation 214.1. In some embodiments, if OBO 302 equals zero, the HE STA2 204.2 is configured to transmit PPDU 220.1 on a randomly selected RU if the physical sense of the randomly selected RU indicates the RU is idle. For example, referring to FIG. 4, HE STA2 204.2 may be configured to decrement OBO 302 by the number of RU for random access, which is four (402.1 through 402.4), regardless of whether the physical sense indicates busy or idle. HE STA2 204.2 may then randomly select a RU assigned for random access 402 where the physical sense indicates the RU assigned for random access 402 is idle. For example, HE STA2 204.2 may transmit PPDU 220.1 on RU assigned for random access 402.3. If no RU assigned for random access 402 indicates idle from the physical sense, then the HE STA2 204.2 will not transmit, in accordance with some embodiments.

In some embodiments, if OBO 302 is zero, then HE STA2 204.2 will randomly select a RU assigned for random access 402, and then determine whether the RU assigned for random access 402 is idle or busy. If the RU assigned for random access 402 indicates idle, then the HE STA2 204.2 will transmit PPDU 220.1 on the randomly selected idle RU assigned for random access 402. If the RU assigned for random access 402 indicates busy, then the HE STA2 204.2 will use a retransmission procedure, in accordance with some embodiments. In some embodiments, if the HE STA 204 attempted to transmit on an RU for random access and was unable to, then the HE STA 204 may use a retransmission procedure.

A retransmission procedure may include one or more of the following. In some embodiments, the OBO 302 may be set to zero for a next trigger frame, e.g., trigger frame 210.2. In some embodiments, the HE STA2 204.2 may double the OCW 304 from its current value and reselect OBO 302 for the next trigger frame, e.g. trigger frame 210.2. In some embodiments, the HE STA2 204.2 may reload the OBO 302 with a value that was determined at the beginning of operation 252 before decrementing for a number of RU assigned for random access 402. In some embodiments, the HE STA2 204.2 may use a same or similar method that the HE STA2 204.2 uses when HE STA2 204.2 identifies a collision when trying to transmit an UL OFDMA PPDU. For example, the HE STA2 204.2 may double the OBO 302 for the first retransmission procedure, where OBO 302 may be limited to a maximum value, which may be based on the size of OCW 304. In some embodiments, the HE STA2 204.2 may randomly select OBO from 0 to OCW minimum.

The method 200 may continue at operation 258 with the master station 204 transmitting TF 210.2. In some embodiments, the trigger frame 210.2 comprises a CS indication 212.2 and resource allocation 214.2. The method 200 continues with operation 260, which may be a duration 232.2 (e.g., SIFS) before the HE STAs 204 are to begin transmitting responses to the trigger frame 210.2. During operation 260, the HE STAs 204 may be configured to determine whether they are going to respond, and, if they are going to respond, an RU for random access to respond on. The method 200 continues with operation 262 where the HE STAs 204 transmit PPDUs if the HE STAs 204 determine to transmit. Operation 254 and 256 are disclosed in conjunction with one another.

HE STAT 204.1 determined it could not transmit after TF 210.1 because the NAV of HE STA1 205.1 was set. HE STA1 204.1 may be configured to perform one or more retransmission procedures, which may include one or more of the following. In some embodiments, the OBO 302 may be set to zero for a next trigger frame, e.g., trigger frame 210.2. In some embodiments, the HE STA1 204.1 may double the OCW 304 and reselect OBO 302 for the next trigger frame, e.g. trigger frame 210.2. In some embodiments, the HE STA1 204.1 may reload the OBO 302 with a value that was determined at the beginning of operation 252 before decrementing for a number of RU assigned for random access 402. In some embodiments, the HE STA1 204.1 may use a same or similar method that the HE STA1 204.1 uses when HE STA1 204.1 identifies a collision when trying to transmit an UL OFDMA PPDU. For example, the HE STA1 204.1 may double the OBO 302 for the first retransmission procedure, where OBO 302 may be limited by a maximum value, which may be based on the size of OCW 304.

For example, for the embodiment where HE STA1 204.1 sets the OBO 302 to zero for trigger frame 210.2, then HE STA1 204.1 may determine that the physical sense is idle and select an RU for random access and transmits PPDU 220.2.

Figure 6:
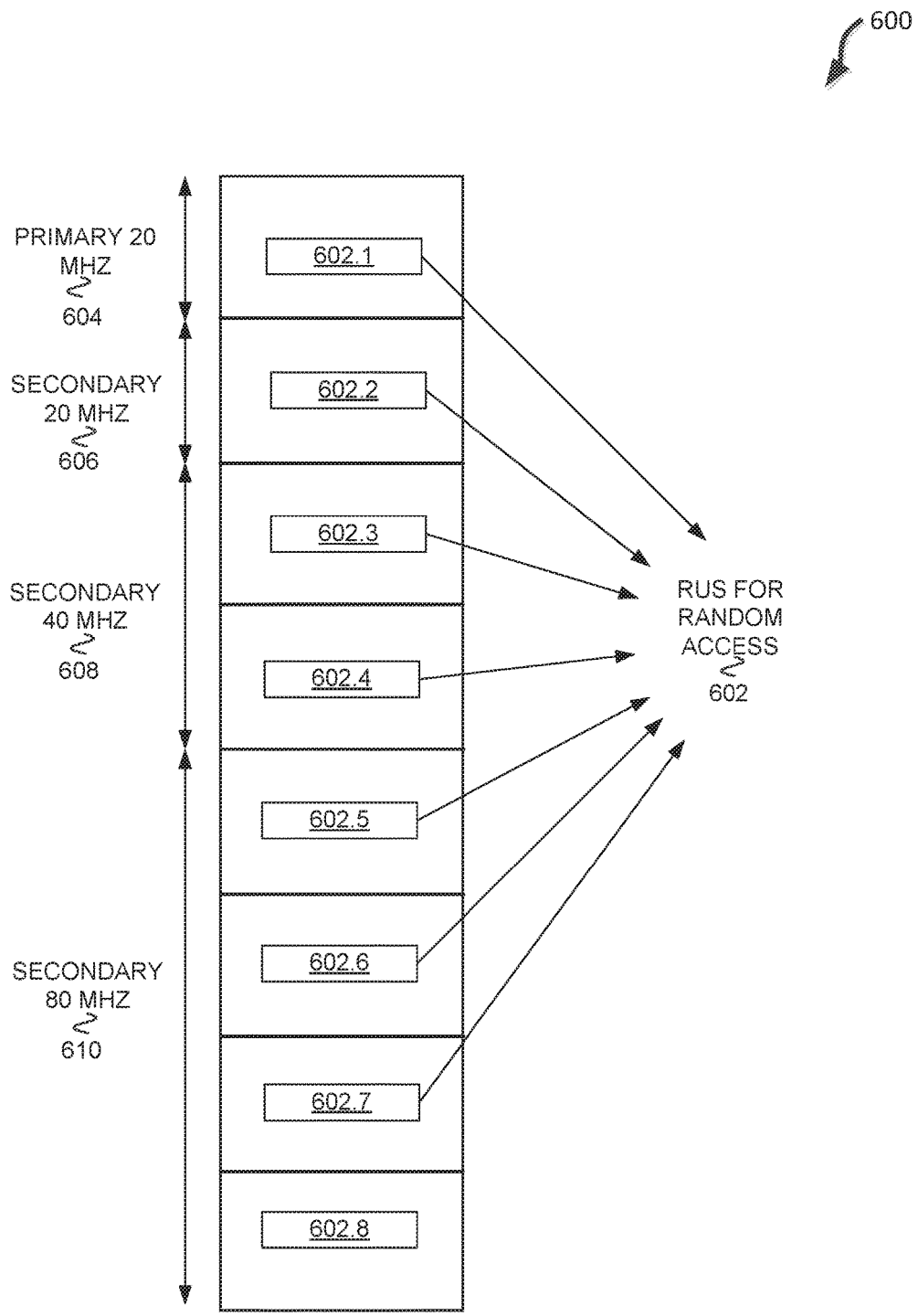
FIG. 6 illustrates performing carrier sensing (CS) in accordance with some embodiments.

FIG. 6 illustrates performing carrier sensing (CS) 600 in accordance with some embodiments. Illustrated in FIG. 6 is a primary 20 MHz 504 sub-channel, a secondary 20 MHz sub-channel 506, a secondary 40 MHz 508 sub-channel, a secondary 80 MHz 610 sub-channel, and RUs for random access 602. In some embodiments, each of the sub-channels may include one or more RUs for random access 602.

In some embodiments, the HE stations 104 and/or master stations 102 are configured to sense the energy of one or more 20 MHz sub-channels that include RUs for random access 602. In some embodiments, the HE stations 104 and/or master station 102 include per 20 MHz sensing hardware for each 20 MHz sub-channel that may include RUs for random access 602.

In other embodiments, the HE stations 104 and/or master stations 102 use a legacy reporting channel list, i.e. an CCA report for each of a primary 20 MHz 504 sub-channel, a secondary 20 MHz sub-channel 506, a secondary 40 MHz 508 sub-channel, and a secondary 80 MHz 610 sub-channel. The CCA report may be for ED or signal detect. The HE stations 104 and/or master stations 102 may be configured so that if a sub-channel CCA report indicates busy, then all RUs for random access 602 within the sub-channel are considered busy. For example, if the CCA report for secondary 80 MHz 610 sub-channel indicated busy (e.g., an ED report), then the HE station 104 or master station 102 would indicate that all RUs for random access 602 within the 80 MHz 610 sub-channel are busy.

In other embodiments, RUs for random access 602 may be within a sub-channel, e.g., 20 MHz, and the HE station 104 and/or master station 102 may determine the CCA for the sub-channel and indicate that all RUs for random access 602 have the same result as the sub-channel, i.e., idle or busy. In some embodiments, the sub-channel may be fixed or communicated by the master station 102 to the HE stations 104.

Figure 7:
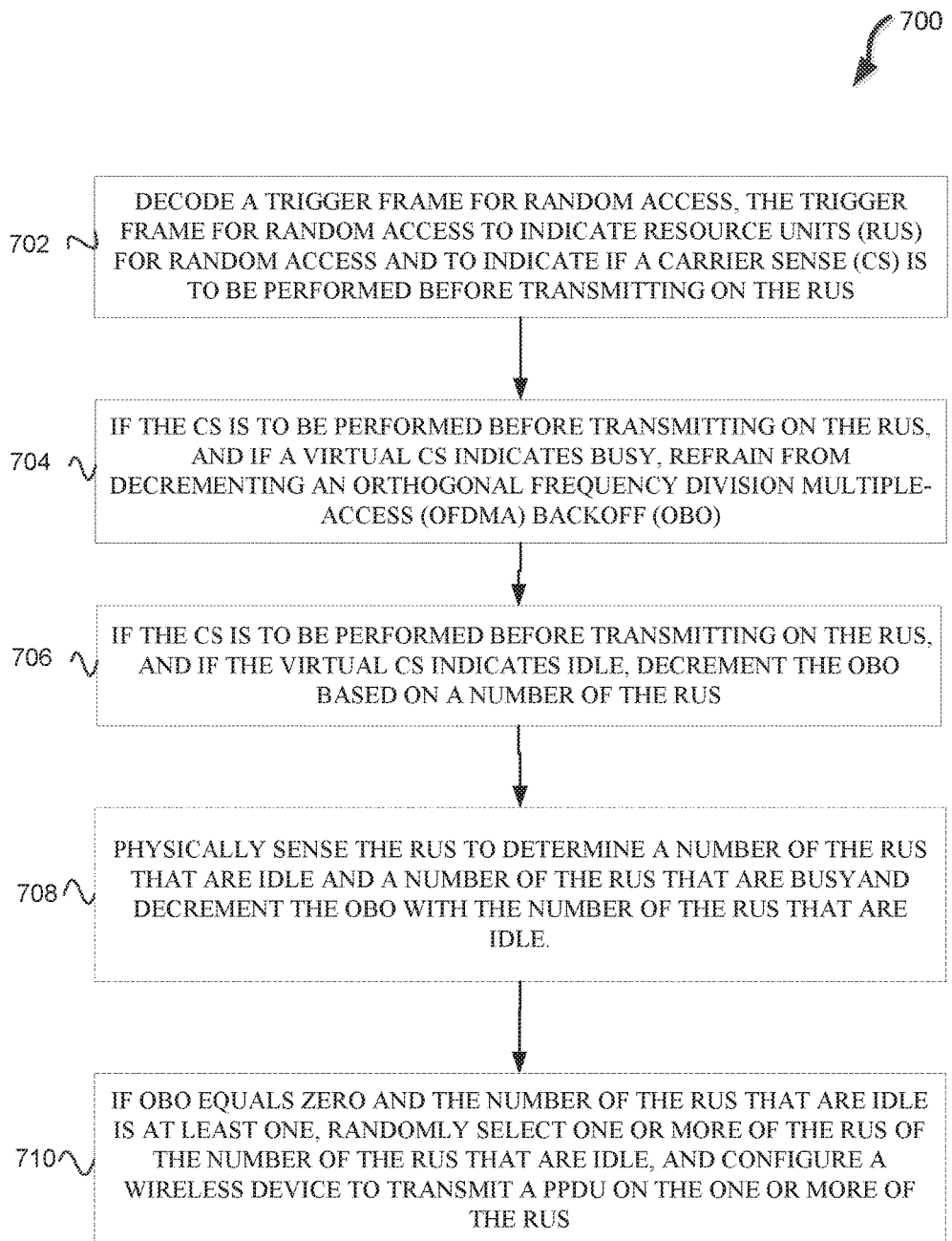
FIG. 7 illustrates a method of random access with carrier sensing in accordance with some embodiments.

FIG. 7 illustrates a method 700 of random access with carrier sensing in accordance with some embodiments. The method 700 begins with operation 702 with decoding a trigger frame for random access, the trigger frame for random access to indicate RUs for random access and to indicate if a CS is to be performed before transmitting on the RUs. For example, HE STAs 204 may decode TF 210.1 with CS indication 212.1 that indicates that the CS is required before responding to the TF 210.1.

The method 700 continues at operation 704 with if the CS is to be performed before transmitting on the RUs, and if a virtual CS indicates busy, refrain from decrementing an orthogonal frequency division multiple-access (OFDMA) backoff (OBO) and, in some embodiments, wait for a next trigger frame. For example, NAV of HE STA1 205.1 indicates the NAV is busy, so HE STA1 204.1 waits for TF 210.2 and does not decrement an OBO 302 of HE STA1 204.1.

The method 700 continues at operation 706 with if the CS is to be performed before transmitting on the RUs, and if the virtual CS indicates idle, decrement the OBO based on a number of the RUs. For example, HE STA2 204.2 may decrement OBO 302 based on a number of RUs indicated in the resource allocation 214.1. HE STA2 204.2 may initially set OBO 302 to a value from 0 to OCW 304. The number of RUs that decrement the OBO 302 may be based on whether a physical sense of the RUs indicates that the RUs are busy or idle.

For example, if RU assigned for random access 402.3 and 402.4 both indicate busy, then OBO 302 may be decremented by two in accordance with some embodiments. In some embodiments, OBO 302 is decremented by a number of the RUs assigned for random access 402 regardless of whether a CS indicates they are busy or free.

In some embodiments, the method 700 optionally continues with operation 708 with physically sensing the RUs to determine a number of the RUs that are idle and a number of the RUs that are busy and decrement the OBO with the number of the RUs that are idle. For example, if RUs assigned for random access 402.3 and 402.4 both indicate busy, and 402.1 and 402.2 indicate idle, then OBO 302 may be decremented by two (for 402.1 and 402.2) in accordance with some embodiments.

In some embodiments, the method 700 optionally continues with operation 710 with if OBO equals zero and the number of the RUs that are idle is at least one, randomly select one or more of the RUs of the number of the RUs that are idle, and configure a wireless device to transmit a PPDU on the one or more of the RUs in accordance with OFDMA. For example, continuing with the example above, OBO 302 may be zero for HE STA 2 204.2, and HE STA 2 204.2 may randomly select between RUs assigned for random access 402.1 and 402.2, and then transmit PPDU 220.1 on the selected RU assigned for random access 402.1 or 402.2.

In some embodiments, the method 700 continues with if the OBO is not zero, a retransmission method is used. For example, HE STA1 204.1 may set OBO 302 to 0 for a next trigger frame for random access 210.2, double OCW 302 and randomly select a new value for OBO 302 from 0 to OCW 304 for a next trigger frame 210.2, or reload OBO 302 to a value of OBO 302 before OBO 302 was decremented in operation 708.

Figure 8:
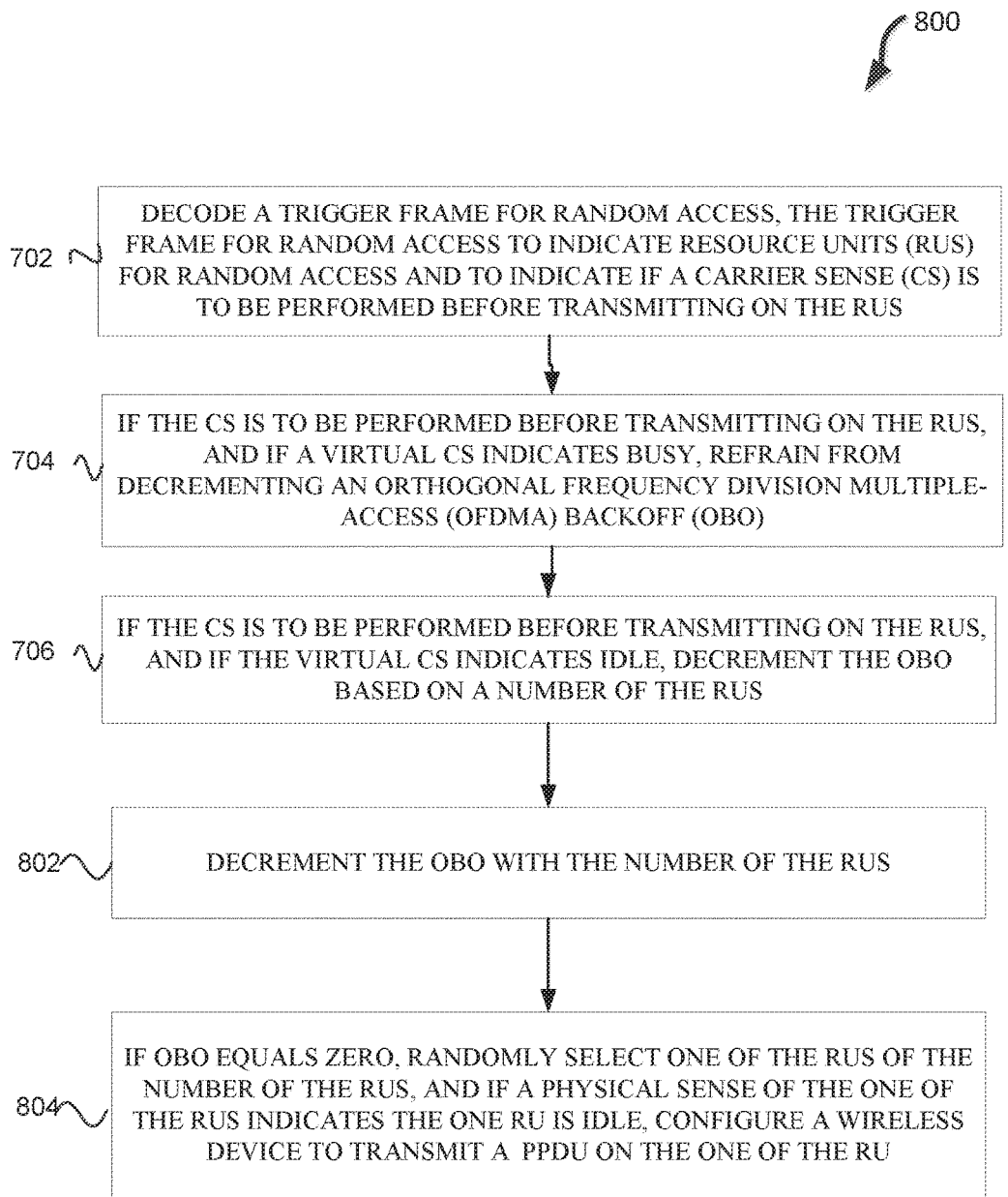
FIG. 8 illustrates a method of random access with carrier sensing in accordance with some embodiments.

FIG. 8 illustrates a method 800 of random access with carrier sensing in accordance with some embodiments. Operations 702 through 706 may be the same or similar as operation 702 through 706 disclosed in conjunction with FIG. 7.

The method 800 may continue at operation 802 with decrementing the OBO with the number of the RUs. For example, HE STA2 204.2 may decrement OBO 302 by four for RU assigned for random access 402.1, 402.2, 402.3, and 402.4.

The method 800 may continue at operation 804 with if OBO equals zero, randomly select one of the RUs of the number of the RUs, and if a physical sense of the one of the RUs indicates the one RU is idle, configure a wireless device to transmit a PPDU on the one of the RUs in accordance with OFDMA.

For example, continuing with the example above, if HE STA2 204.2 randomly selects RU assigned for random access 402.1, and a physical sense of RU assigned for random access 402.1 indicates it is idle, then HE STA2 204.2 transmits PPDU 220.1 on RU assigned for random access 402.1.

In some embodiments, the method 800 continues with if the OBO is not zero or the RU assigned for random access is busy, then a retransmission method is used. For example, HE STA1 204.1 may set OBO 302 to 0 for a next trigger frame for random access 210.2, double OCW 302 and randomly select a new value for OBO 302 from 0 to OCW 304 for a next trigger frame 210.2, or reload OBO 302 to a value of OBO 302 before OBO 302 was decremented in operation 708.

Figure 9:
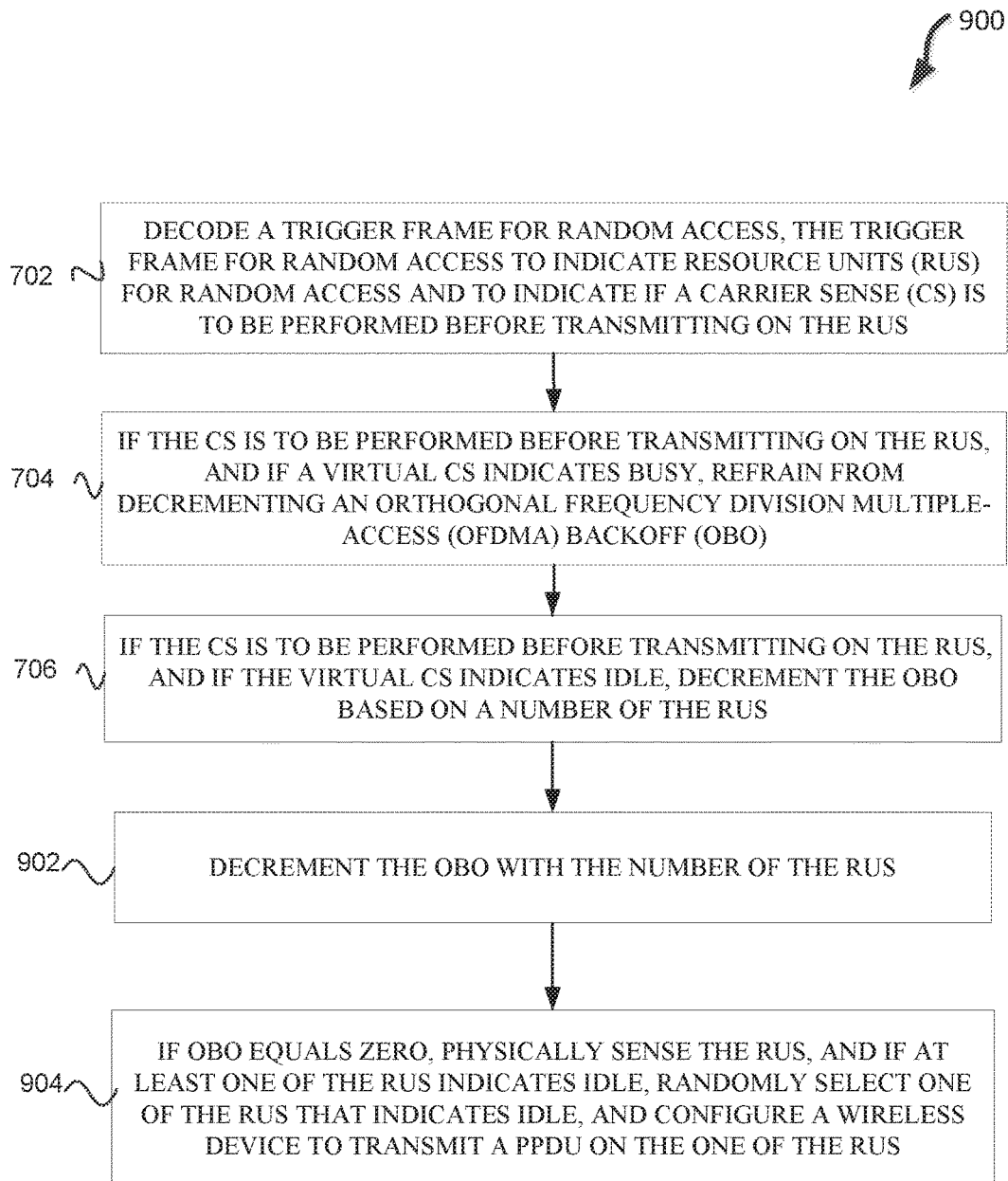
FIG. 9 illustrates a method of random access with carrier sensing in accordance with some embodiments.

FIG. 9 illustrates a method 900 of random access with carrier sensing in accordance with some embodiments. Operations 702 through 706 may be the same or similar as operation 702 through 706 disclosed in conjunction with FIG. 7.

The method 900 may continue at operation 902 with decrementing the OBO with the number of the RUs. For example, HE STA2 204.2 may decrement OBO 302 by four for RU assigned for random access 402.1, 402.2, 402.3, and 402.4.

The method 900 may continue at operation 904 with if OBO equals zero, physically sense the RUs, and if at least one of the RUs indicates idle, randomly select one of the RUs that indicates idle, and configure a wireless device to transmit a PPDU on the one of the RUs in accordance with OFDMA.

For example, continuing with the example above, if HE STA2 204.2 randomly selects an RU assigned for random access 402 that is idle, e.g., 402.1, then HE STA2 204.2 transmits PPDU 220.1 on RU assigned for random access 402.1.

In some embodiments, the method 900 continues with if the OBO is not zero, then a retransmission method is used. For example, HE STA1 204.1 may set OBO 302 to 0 for a next trigger frame for random access 210.2, double OCW 302 and randomly select a new value for OBO 302 from 0 to OCW 304 for a next trigger frame 210.2, or reload OBO 302 to a value of OBO 302 before OBO 302 was decremented in operation 708.

Figure 10:
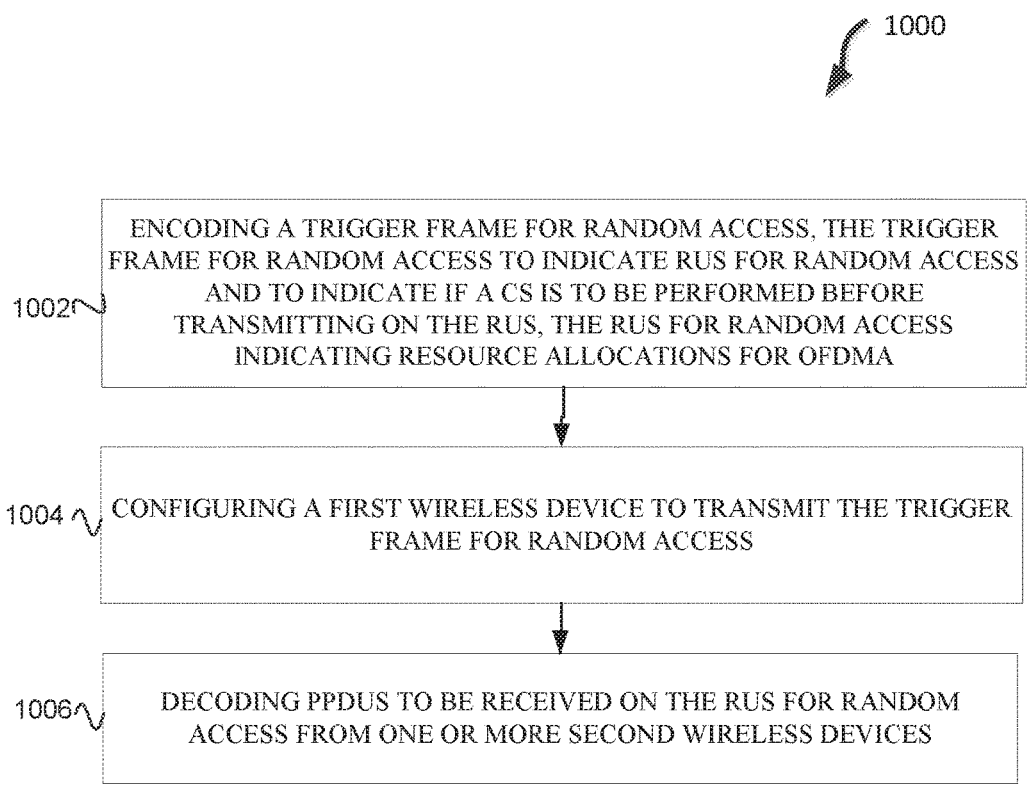
FIG. 10 illustrates a method of random access with carrier sensing in accordance with some embodiments.

FIG. 10 illustrates a method 1000 of random access with carrier sensing in accordance with some embodiments. The method 1000 begins at operation 1002 with encoding a trigger frame for random access, the trigger frame for random access to indicate RUs for random access and to indicate if a CS is to be performed before transmitting on the RUs, the RUs for random access indicating resource allocations for OFDMA. For example, master station 202 encodes TF 210.1 with CS indication 212.1 and resource allocation 214.1. CS indication 212.1 may indicate that CS is required before transmitting on an RU. Resource allocation 214.1 may include one or more RUs, e.g. RU assigned for random access 402, 502, and 602.

The method 1000 may continue at operation 1004 with configuring a first wireless device to transmit the trigger frame for random access. For example, an apparatus of master station 202 may configure master station 202 to transmit the TF 210.1.

The method 1000 may continue at operation 1006 with decoding PPDUs to be received on the RUs for random access from one or more second wireless devices. For example, master station 202 receives PPDU 220.1 from HE STA2 204.2 on one of the RUs for random access indicated in resource allocation 214.1.

Figure 11:
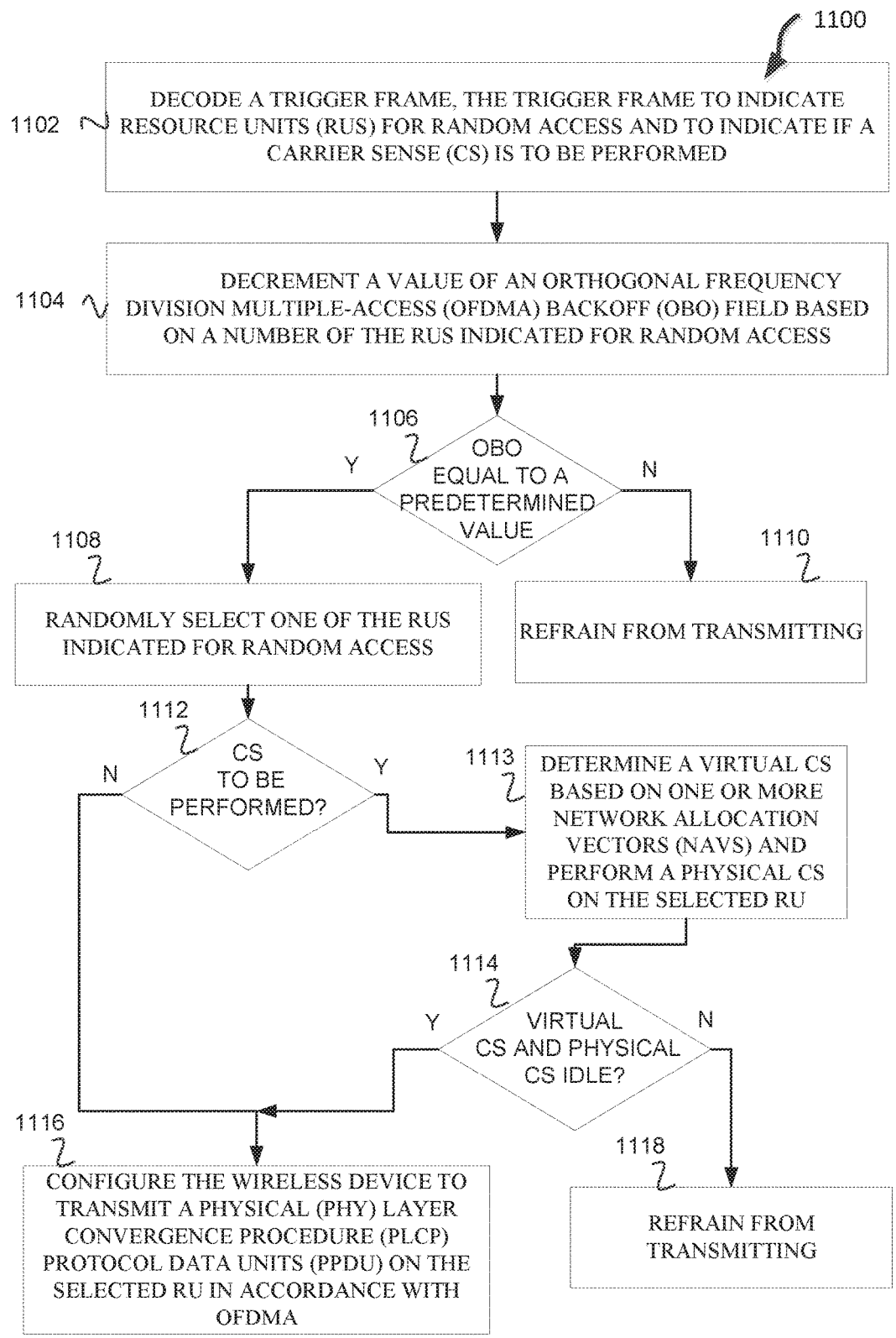
FIG. 11 illustrates a method of random access with carrier sensing in accordance with some embodiments.

FIG. 11 illustrates a method 1100 of random access with carrier sensing in accordance with some embodiments. The method 1100 begins at operation 1102 with decoding a trigger frame, the trigger frame to indicate RUs for random access and to indicate if a CS is to be performed, e.g., before transmitting on an RU for random access. The trigger frame may be a trigger frame for random access.

For example, HE STAs 204 may decode TF 210.1 with CS indication 212.1 that indicates that the CS is required before responding to the TF 210.1, and resource allocation 214.1, which may indicate RUs for random access.

The method 1100 continues at operation 1104 with decrementing a value of an OBO field based on a number of the RUs indicated for random access.

For example, the OBO may be decremented with a number of the RUs for random access. The OBO may be decremented in a different manner as disclosed herein. In some embodiments, the OBO may be decremented only to zero and not negative numbers.

The method 1100 continues at operation 1106 with is OBO equal to a predetermined value, e.g., zero. For example, HE STA2 204.2 may determine if OBO 302 equals zero.

If OBO is not equal to zero, then the method 1110 continues at operation 1110 with refraining from transmitting. For example, HE STA2 204.2 may determine that OBO is not zero and wait until TF 210.2 to continue to decrement OBO.

If OBO equals to the predetermined value, then the method 1100 continues at operation 1108 with randomly selecting one RU of the RUs for random access. For example, HE STA2 204.2 may randomly select one of the RU indicated for random access 402.1. The RUs indicated in the trigger frame may be said to be assigned for random access.

The method 1100 continues at operation 1112 with is CS to be performed. If CS is not to be performed, then the method 1100 continues at operation 1116 with configure the wireless device to transmit a physical (PHY) layer convergence procedure (PLCP) protocol data units (PPDU) on the selected RU in accordance with OFDMA. For example, HE STA2 204.2 may transmit PPDU 220.1 on RU assigned for random access 402.1.

If the CS is to be performed, the method 1100 continues at operation 1113 with determining a virtual CS based on one or more network allocation vectors (NAVs) and perform a physical CS on the selected RU. For example, HE STA2 204.2 may determine whether the NAV of HE STA2 205.2 is idle, and HE STA2 204.2 may perform a physical CS of the selected RU.

The method 1100 continues at operation 1114 with are the virtual CS and physical CS idle. If the virtual CS and the physical CS are idle, then the method 1100 continues at operation 1116.

If the virtual CS and physical CS are not idle, then the method 1100 continues at operation 1118 with refraining from transmitting. Operation 1118 may include one or more of the following operations: set the value of the OBO field to 0 for a next trigger frame; randomly select the value of the OBO field from 0 to a value of an OFDMA OCW minimum field; double the value of the OCW field from a current value of the OCW field; randomly select a new value for the value of the OBO field from 0 to a value of the OCW field for a next trigger frame; and, reload the value of the OBO field to a value of the OBO field before the value of the OBO field is decremented.

Figure 12:
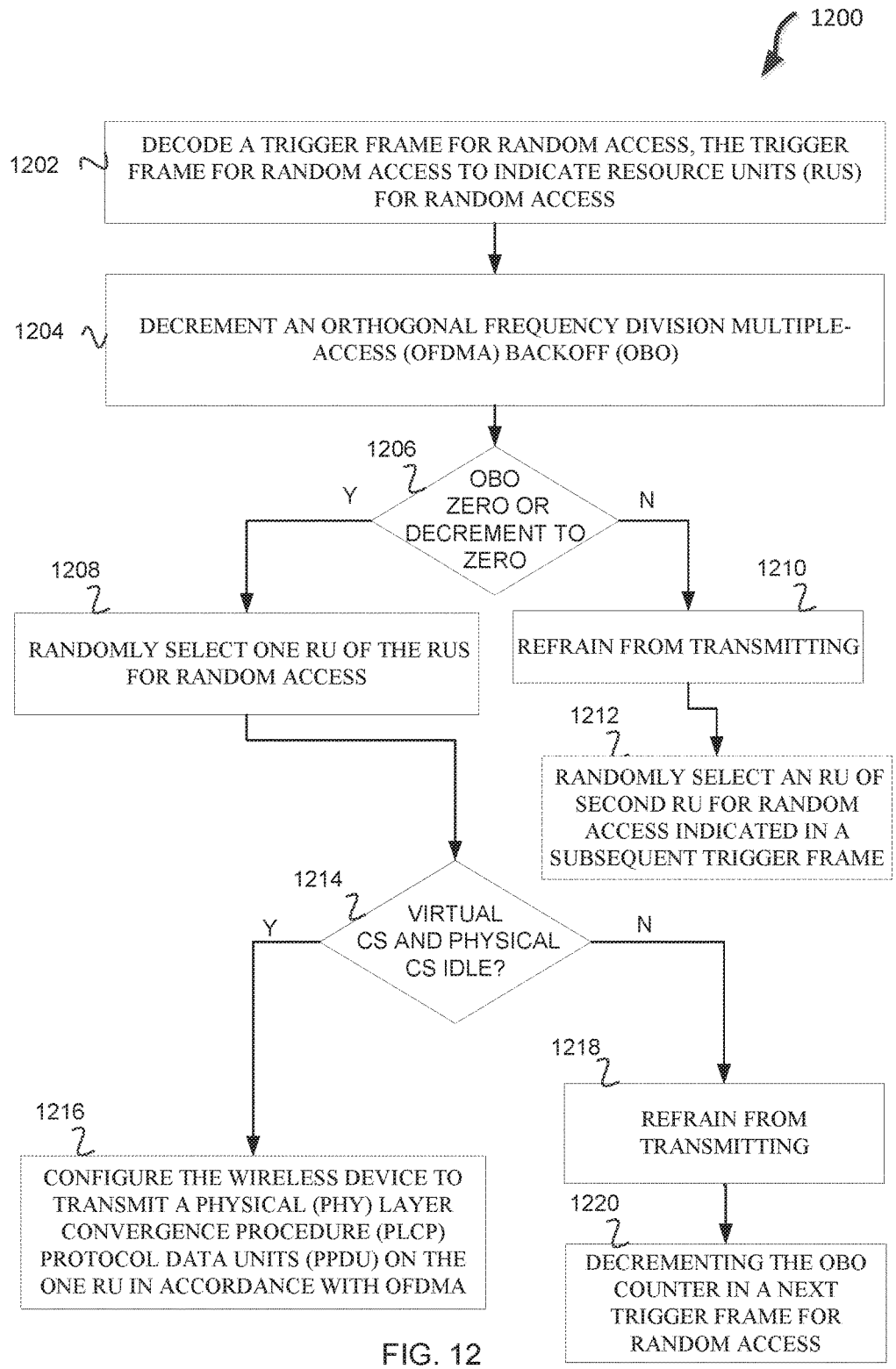
FIG. 12 illustrates a method of random access with carrier sensing in accordance with some embodiments.

FIG. 12 illustrates a method 1200 of random access with carrier sensing in accordance with some embodiments. The method 1200 begins at operation 1202 with decoding a trigger frame for random access, the trigger frame for random access to indicate resource units (RUs) for random access.

For example, HE STAs 204 may decode TF 210.1 resource allocation 214.1, which may indicate RUs for random access.

The method 1200 continues at operation 1204 with decrementing an OBO. For example, the OBO may be decremented with a number of the RUs for random access. The OBO may be decremented in a different manner as disclosed herein. In some embodiments, the OBO may be decremented only to zero and not negative numbers.

The method 1200 continues at operation 1206 with is OBO zero or does it decrement to zero. For example, HE STA2 204.2 may determine if OBO 302 equals zero. HE STA2 204.2 may decrement OBO based on a number of RUs in the resource allocation 214.1. In some embodiments, HE STA2 204.2 may decrement OBO in another manner, e.g., based on an idle time of a channel or based on a number trigger frame for random access, etc.

If OBO is not equal to zero, then the method 1210 continues at operation 1210 with refraining from transmitting. For example, HE STA2 204.2 may determine that OBO is not zero and wait until TF 210.2 to continue to decrement OBO. The method optionally continues with randomly selecting an RU of a second RU for random access indicted in a subsequent trigger frame. For example, HE STA1 204.1 may randomly select an RU from indicated in TF 210 resource allocation 214.1. In some embodiments, the HE STA 204 may select the RU in the subsequent trigger frame regardless of the value of OBO.

If OBO equals to zero, then the method 1200 continues at operation 1208 with randomly selecting one RU of the RUs for random access. For example, HE STA2 204.2 may randomly select RU assigned for random access 402.1.

The method 1200 continues at operation 1214 with are the virtual CS and physical CS idle. If the virtual CS and the physical CS are idle, then the method 1200 continues at operation 1216 with configuring the wireless device to transmit a PPDU. For example, HE STA2 204.2 may transmit PPDU 220.1.

If the virtual CS and physical CS are not idle, then the method 1200 continues at operation 1218 with refraining from transmitting. Operation 1218 may include one or more of the following operations: setting OBO to 0 for a next trigger frame for random access; doubling OCW and randomly select a new value for OBO from 0 to OCW for a next trigger frame; reloading OBO to a value of OBO before OBO was to be decremented; and, operation 1220 of decrementing the OBO counter in a next trigger frame for random access.

Figure 13:
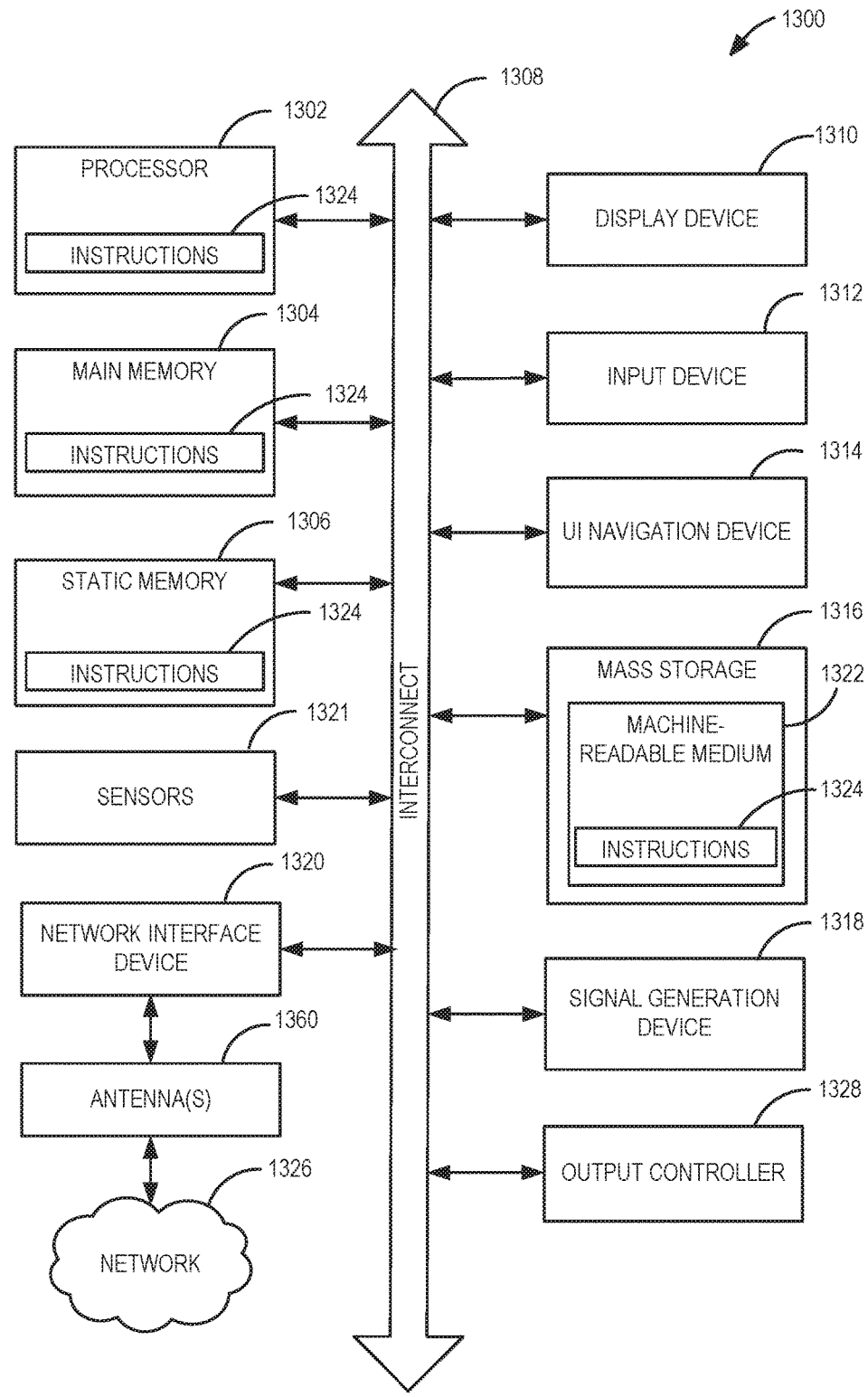
FIG. 13 illustrates a block diagram of an example machine upon which any one or more of the techniques (e.g., methodologies) discussed herein may perform.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a master station 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308.

Specific examples of main memory 1304 include Random Access Memory (RAM), and semiconductor memory devices, which may include, in some embodiments, storage locations in semiconductors such as registers. Specific examples of static memory 1306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1300 may further include a display device 1310, an input device 1312 (e.g., a keyboard), and a user interface (UI) navigation device 1314 (e.g., a mouse). In an example, the display device 1310, input device 1312 and UI navigation device 1314 may be a touch screen display. The machine 1300 may additionally include a mass storage (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 1302 and/or instructions 1324 may comprise processing circuitry and/or transceiver circuitry.

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1322 is illustrated as a single medium, the term "machine readable medium" may include a single medium or multiple media (e.g., a centralized or distributed database, and/or associated caches and servers) configured to store the one or more instructions 1324.

An apparatus of the machine 1300 may be one or more of a hardware processor 1302 (e.g., a central processing unit (CPU), a graphics processing unit (GPU), a hardware processor core, or any combination thereof), a main memory 1304 and a static memory 1306, sensors 1321, network interface device 1320, antennas 1360, a display device 1310, an input device 1312, a UI navigation device 1314, a mass storage 1316, instructions 1324, a signal generation device 1318, and an output controller 1328. The apparatus may be configured to perform one or more of the methods and/or operations disclosed herein. The apparatus may be intended as a component of the machine 1300 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others.

In an example, the network interface device 1320 may include one or more physical jacks (e.g., Ethernet, coaxial, or phone jacks) or one or more antennas to connect to the communications network 1326. In an example, the network interface device 1320 may include one or more antennas 1360 to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the machine 1300, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Example 1 is an apparatus of a wireless device, the apparatus comprising: memory; and processing circuitry coupled to the memory, the processing circuitry configured to: decode a trigger frame, the trigger frame to indicate resource units (RUs) for random access and to indicate if a carrier sense (CS) is to be performed; decrement a value of an orthogonal frequency division multiple-access (OFDMA) backoff (OBO) field based on a number of the RUs indicated for random access; and when the value of the OBO field reaches a predetermined value, randomly select one of the RUs indicated for random access, and if the CS is to be performed, determine a virtual CS based on one or more network allocation vectors (NAVs) and perform a physical CS on the selected RU, and if the virtual CS and the physical CS both indicate that the selected RU is idle, configure the wireless device to transmit a physical (PHY) layer convergence procedure (PLCP) protocol data units (PPDU) on the selected RU in accordance with OFDMA.

In Example 2, the subject matter of Example 1 optionally includes wherein the processing circuitry is further configure to: if OBO equals zero and if the CS is not to be performed before transmitting on the one RU, configure the wireless device to transmit the PPDU in the one RU without determining the virtual CS based on the one or more NAVs or performing the physical CS on the selected RU.

In Example 3, the subject matter of any one or more of Examples 1-2 optionally include wherein the processing circuitry is further configured to: if the value of the OBO field reaches a predetermined value, and if the virtual CS or the physical CS indicates that the selected RU is busy, refrain from transmitting the PPDU in the one RU.

In Example 4, the subject matter of any one or more of Examples 1-3 optionally include wherein the trigger frame comprises indicates that the trigger frame is a trigger frame for random access.

In Example 5, the subject matter of any one or more of Examples 1-4 optionally include wherein the predetermined value is zero.

In Example 6, the subject matter of any one or more of Examples 1-5 optionally include wherein the processing circuitry is further configured to: determine that the virtual CS indicates busy if a NAV of the one or more NAVs is set and the set NAV was not set by a frame originating from a same wireless device that is to transmit the trigger frame or from a second wireless device that is part of the same basic service (BSS) set as the wireless device of the apparatus.

In Example 7, the subject matter of any one or more of Examples 1-6 optionally include wherein the processing circuitry is further configured to: determine that the virtual CS indicates busy if a NAV is set of the one or more NAVs and the PPDU to be transmitted by the wireless device is not an acknowledgement frame with a first duration below a threshold duration or a block acknowledgment frame with a second duration below the threshold duration.

In Example 8, the subject matter of any one or more of Examples 1-7 optionally include wherein the processing circuitry is further configured to: when the value of the OBO field reaches a predetermined value, and if the CS is to be performed and if the virtual CS or the physical CS indicate the one RU is busy, perform one from the following group: set the value of the OBO field to 0 for a next trigger frame; randomly select the value of the OBO field from 0 to a value of an OFDMA Contention Window (OCW) minimum field; double the value of the OCW field from a current value of the OCW field; randomly select a new value for the value of the OBO field from 0 to a value of the OCW field for a next trigger frame; and, reload the value of the OBO field to a value of the OBO field before the value of the OBO field is decremented.

In Example 9, the subject matter of any one or more of Examples 1-8 optionally include wherein the processing circuitry is further configured to: if the trigger frame is an initial transmission, randomly select a value for the OBO field from 0 to a minimum value of an OFDMA contention window (OCW) (OCWmin) field.

In Example 10, the subject matter of any one or more of Examples 1-9 optionally include wherein the processing circuitry is further configured to: perform the physical CS of the selected RU based on energy detect (ED).

In Example 11, the subject matter of Example 10 optionally includes wherein the physical CS of the selected RU is to be performed on a 20 MHz bandwidth basis.

In Example 12, the subject matter of Example 11 optionally includes wherein the wireless device comprises carrier sensing hardware to perform ED for each 20 MHz channel that comprises the RUs indicated for random access.

In Example 13, the subject matter of any one or more of Examples 10-12 optionally include wherein the processing circuitry is further configured to: perform the physical CS of the selected RU by performing a physical carrier sense of a 20 MHz primary channel, a secondary 20 MHz channel, a secondary 40 MHz channel, and a 80 MHz channel, and assign each of the RUs indicated for random access as idle or busy based on the results.

In Example 14, the subject matter of any one or more of Examples 1-13 optionally include wherein the processing circuitry is further configured to: if the value of the value of the OBO field is not equal to zero, refrain from transmitting and continue to decrement the value of the OBO field in a subsequent trigger frame.

In Example 15, the subject matter of any one or more of Examples 1-14 optionally include wherein each of the RUs for random access are a same size.

In Example 16, the subject matter of any one or more of Examples 1-15 optionally include wherein the wireless device is one from the following group: an Institute of Electrical and Electronic Engineers (IEEE) 802.11ax access point, an IEEE 802.11ax station, an IEEE 802.11 station, and an IEEE 802.11 access point.

In Example 17, the subject matter of any one or more of Examples 1-16 optionally include transceiver circuitry coupled to the processing circuitry; and, one or more antennas coupled to the transceiver circuitry.

Example 18 is a non-transitory computer-readable storage medium that stores instructions for execution by one or more processors, the instructions to configure the one or more processors to cause an apparatus of a wireless device to: decode a trigger frame for random access, the trigger frame for random access to indicate resource units (RUs) for random access; and if an orthogonal frequency division multiple-access (OFDMA) backoff (OBO) is zero or decrements to zero, randomly select one RU of the RUs for random access, and if a virtual CS and a physical CS of the one RU indicates the one RU is idle, configure the wireless device to transmit a physical (PHY) layer convergence procedure (PLCP) protocol data units (PPDU) on the one RU in accordance with OFDMA, if the virtual CS or the physical CS of the one RU indicates the one RU is busy, refrain from transmitting the PPDU.

In Example 19, the subject matter of Example 18 optionally includes wherein the instructions further configure the one or more processors to cause the apparatus to: if OBO is zero or decrements to zero, and the virtual CS or the physical CS of the one RU indicates the one RU is busy, randomly select a second RU of second RUs for random access indicated in a subsequent trigger frame.

In Example 20, the subject matter of any one or more of Examples 18-19 optionally include wherein the instructions further configure the one or more processors to cause the apparatus to: if OBO it not zero, resume decrementing the OBO counter in a next trigger frame for random access.

Example 21 is a method performed by a wireless device, the method comprising: decoding a trigger frame, the trigger frame to indicate resource units (RUs) for random access and to indicate if a carrier sense (CS) is to be performed; decrementing a value of an orthogonal frequency division multiple-access (OFDMA) backoff (OBO) field based on a number of the RUs indicated for random access; and when the value of the OBO field reaches a predetermined value, randomly selecting one of the RUs indicated for random access, and if the CS is to be performed, determining a virtual CS based on one or more network allocation vectors (NAVs) and performing a physical CS on the selected RU, and if the virtual CS and the physical CS both indicate that the selected RU is idle, configuring the wireless device to transmit a physical (PHY) layer convergence procedure (PLCP) protocol data units (PPDU) on the selected RU in accordance with OFDMA.

In Example 22, the subject matter of Example 21 optionally includes the method further comprising: configuring the wireless device to transmit the PPDU in the one RU without determining the virtual CS based on the one or more NAVs or performing the physical CS on the selected RU, if OBO equals zero and if the CS is not to be performed before transmitting on the one RU.

Example 23 is an apparatus of a first wireless device, the apparatus comprising memory; and processing circuitry coupled to the memory, the processing circuity configured to: encode a trigger frame for random access, the trigger frame for random access to indicate resource units (RUs) for random access and to indicate if a carrier sense (CS) is to be performed before transmitting on the RUs, the RUs for random access indicating resource allocations for orthogonal frequency division multiple-access (OFDMA); configure the first wireless device to transmit the trigger frame for random access; and decode one or more physical (PHY) layer convergence procedure (PLCP) protocol data units (PPDUs) to be received on the RUs for random access from one or more second wireless devices.

In Example 24, the subject matter of Example 23 optionally includes wherein each of the RUs for random access are a same size.

In Example 25, the subject matter of any one or more of Examples 23-24 optionally include transceiver circuitry coupled to the processing circuitry; and, one or more antennas coupled to the transceiver circuitry.

Example 26 is an apparatus of a wireless device, the apparatus comprising: means for decoding a trigger frame, the trigger frame to indicate resource units (RUs) for random access and to indicate if a carrier sense (CS) is to be performed; means for decrementing a value of an orthogonal frequency division multiple-access (OFDMA) backoff (OBO) field based on a number of the RUs indicated for random access; and when the value of the OBO field reaches a predetermined value, means for randomly selecting one of the RUs indicated for random access, and if the CS is to be performed, means for determining a virtual CS based on one or more network allocation vectors (NAVs) and perform a physical CS on the selected RU, and if the virtual CS and the physical CS both indicate that the selected RU is idle, means for configuring the wireless device to transmit a physical (PHY) layer convergence procedure (PLCP) protocol data units (PPDU) on the selected RU in accordance with OFDMA.

In Example 27, the subject matter of Example 26 optionally includes wherein the apparatus further comprises: if OBO equals zero and if the CS is not to be performed before transmitting on the one RU, means for configuring the wireless device to transmit the PPDU in the one RU without determining the virtual CS based on the one or more NAVs or performing the physical CS on the selected RU.

In Example 28, the subject matter of any one or more of Examples 26-27 optionally include wherein the apparatus further comprises: if the value of the OBO field reaches a predetermined value, and if the virtual CS or the physical CS indicates that the selected RU is busy, means for refraining from transmitting the PPDU in the one RU.

In Example 29, the subject matter of any one or more of Examples 26-28 optionally include wherein the trigger frame comprises indicates that the trigger frame is a trigger frame for random access.

In Example 30, the subject matter of any one or more of Examples 26-29 optionally include wherein the predetermined value is zero.

In Example 31, the subject matter of any one or more of Examples 26-30 optionally include wherein the apparatus further comprises: means for determining that the virtual CS indicates busy if a NAV of the one or more NAVs is set and the set NAV was not set by a frame originating from a same wireless device that is to transmit the trigger frame or from a second wireless device that is part of the same basic service (BSS) set as the wireless device of the apparatus.

In Example 32, the subject matter of any one or more of Examples 26-31 optionally include wherein the apparatus further comprises: means for determining that the virtual CS indicates busy if a NAV is set of the one or more NAVs and the PPDU to be transmitted by the wireless device is not an acknowledgement frame with a first duration below a threshold duration or a block acknowledgment frame with a second duration below the threshold duration.

In Example 33, the subject matter of any one or more of Examples 26-32 optionally include wherein the apparatus further comprises: when the value of the OBO field reaches a predetermined value, and if the CS is to be performed and if the virtual CS or the physical CS indicate the one RU is busy, means for performing one from the following group: set the value of the OBO field to 0 for a next trigger frame; randomly select the value of the OBO field from 0 to a value of an OFDMA Contention Window (OCW) minimum field; double the value of the OCW field from a current value of the OCW field; randomly select a new value for the value of the OBO field from 0 to a value of the OCW field for a next trigger frame; and, reload the value of the OBO field to a value of the OBO field before the value of the OBO field is decremented.

In Example 34, the subject matter of any one or more of Examples 26-33 optionally include wherein the apparatus further comprises: if the trigger frame is an initial transmission, means for randomly selecting a value for the OBO field from 0 to a minimum value of an OFDMA contention window (OCW) (OCWmin) field.

In Example 35, the subject matter of any one or more of Examples 26-34 optionally include wherein the apparatus further comprises: means for performing the physical CS of the selected RU based on energy detect (ED).

In Example 36, the subject matter of Example 35 optionally includes wherein the physical CS of the selected RU is to be performed on a 20 MHz bandwidth basis.

In Example 37, the subject matter of Example 36 optionally includes wherein the wireless device comprises carrier sensing hardware to perform ED for each 20 MHz channel that comprises the RUs indicated for random access.

In Example 38, the subject matter of any one or more of Examples 36-37 optionally include wherein the apparatus further comprises: means for performing the physical CS of the selected RU by performing a physical carrier sense of a 20 MHz primary channel, a secondary 20 MHz channel, a secondary 40 MHz channel, and a 80 MHz channel, and assign each of the RUs indicated for random access as idle or busy based on the results.

In Example 39, the subject matter of any one or more of Examples 26-38 optionally include wherein the apparatus further comprises: if the value of the value of the OBO field is not equal to zero, means for refraining from transmitting and continue to decrement the value of the OBO field in a subsequent trigger frame.

In Example 40, the subject matter of any one or more of Examples 26-39 optionally include wherein each of the RUs for random access are a same size.

In Example 41, the subject matter of any one or more of Examples 26-40 optionally include wherein the wireless device is one from the following group: an Institute of Electrical and Electronic Engineers (IEEE) 802.11ax access point, an IEEE 802.11ax station, an IEEE 802.11 station, and an IEEE 802.11 access point.

In Example 42, the subject matter of any one or more of Examples 26-41 optionally include means for processing radio wave; and, means for receiving and transmitting the radio waves coupled to the means for processing the radio waves.

Example 43 is a non-transitory computer-readable storage medium that stores instructions for execution by one or more processors, the instructions to configure the one or more processors to cause an apparatus of a wireless device to: encode a trigger frame for random access, the trigger frame for random access to indicate resource units (RUs) for random access and to indicate if a carrier sense (CS) is to be performed before transmitting on the RUs, the RUs for random access indicating resource allocations for orthogonal frequency division multiple-access (OFDMA); configure the first wireless device to transmit the trigger frame for random access; and decode one or more physical (PHY) layer convergence procedure (PLCP) protocol data units (PPDUs) to be received on the RUs for random access from one or more second wireless devices.

In Example 44, the subject matter of Example 43 optionally includes wherein each of the RUs for random access are a same size.

Example 45 is a method performed by an apparatus of a wireless device, the method comprising: encoding a trigger frame for random access, the trigger frame for random access to indicate resource units (RUs) for random access and to indicate if a carrier sense (CS) is to be performed before transmitting on the RUs, the RUs for random access indicating resource allocations for orthogonal frequency division multiple-access (OFDMA); configuring the first wireless device to transmit the trigger frame for random access; and decoding one or more physical (PHY) layer convergence procedure (PLCP) protocol data units (PPDUs) to be received on the RUs for random access from one or more second wireless devices.

In Example 46, the subject matter of Example 45 optionally includes wherein each of the RUs for random access are a same size.

Example 47 is an apparatus of a wireless device, the apparatus comprising: means for encoding a trigger frame for random access, the trigger frame for random access to indicate resource units (RUs) for random access and to indicate if a carrier sense (CS) is to be performed before transmitting on the RUs, the RUs for random access indicating resource allocations for orthogonal frequency division multiple-access (OFDMA), means for configuring the first wireless device to transmit the trigger frame for random access; and means for decoding one or more physical (PHY) layer convergence procedure (PLCP) protocol data units (PPDUs) to be received on the RUs for random access from one or more second wireless devices.

In Example 48, the subject matter of Example 47 optionally includes wherein each of the RUs for random access are a same size.

In Example 49, the subject matter of any one or more of Examples 46-48 optionally include means for processing radio wave; and, means for receiving and transmitting the radio waves coupled to the means for processing the radio waves.

Example 50 is an apparatus of a wireless device, the apparatus comprising: memory; and processing circuitry coupled to the memory, the processing circuity configured to: decode a trigger frame for random access, the trigger frame for random access to indicate resource units (RUs) for random access; and if an orthogonal frequency division multiple-access (OFDMA) backoff (OBO) is zero or decrements to zero, randomly select one RU of the RUs for random access, and if a virtual CS and a physical CS of the one RU indicates the one RU is idle, configure the wireless device to transmit a physical (PHY) layer convergence procedure (PLCP) protocol data units (PPDU) on the one RU in accordance with OFDMA, if the virtual CS or the physical CS of the one RU indicates the one RU is busy, refrain from transmitting the PPDU.

In Example 51, the subject matter of Example 50 optionally includes wherein the processing circuitry is further configured to: if OBO is zero or decrements to zero, and the virtual CS or the physical CS of the one RU indicates the one RU is busy, randomly select a second RU of second RUs for random access indicated in a subsequent trigger frame.

In Example 52, the subject matter of any one or more of Examples 50-51 optionally include wherein the processing circuitry is further configured to: if OBO it not zero, resume decrementing the OBO counter in a next trigger frame for random access.

In Example 53, the subject matter of any one or more of Examples 50-52 optionally include wherein each of the RUs for random access are a same size.

In Example 54, the subject matter of any one or more of Examples 50-53 optionally include wherein the wireless device is one from the following group: an Institute of Electrical and Electronic Engineers (IEEE) 802.11ax access point, an IEEE 802.11ax station, an IEEE 802.11 station, and an IEEE 802.11 access point.

In Example 55, the subject matter of any one or more of Examples 50-54 optionally include transceiver circuitry coupled to the processing circuitry; and, one or more antennas coupled to the transceiver circuitry.

Example 56 is a method performed by an apparatus of a wireless device, the method comprising: decoding a trigger frame for random access, the trigger frame for random access to indicate resource units (RUs) for random access; and if an orthogonal frequency division multiple-access (OFDMA) backoff (OBO) is zero or decrements to zero, randomly selecting one RU of the RUs for random access, and if a virtual CS and a physical CS of the one RU indicates the one RU is idle, configuring the wireless device to transmit a physical (PHY) layer convergence procedure (PLCP) protocol data units (PPDU) on the one RU in accordance with OFDMA, if the virtual CS or the physical CS of the one RU indicates the one RU is busy, refraining from transmitting the PPDU.

In Example 57, the subject matter of Example 56 optionally includes the method further comprising: if OBO is zero or decrements to zero, and the virtual CS or the physical CS of the one RU indicates the one RU is busy, randomly selecting a second RU of second RUs for random access indicated in a subsequent trigger frame.

In Example 58, the subject matter of any one or more of Examples 56-57 optionally include the method further comprising: if OBO it not zero, resuming decrementing the OBO counter in a next trigger frame for random access.

In Example 59, the subject matter of any one or more of Examples 56-58 optionally include wherein each of the RUs for random access are a same size.

In Example 60, the subject matter of any one or more of Examples 56-59 optionally include wherein the wireless device is one from the following group: an Institute of Electrical and Electronic Engineers (IEEE) 802.11ax access point, an IEEE 802.11ax station, an IEEE 802.11 station, and an IEEE 802.11 access point.

Example 61 is a apparatus of a wireless device, the apparatus comprising: means for decoding a trigger frame for random access, the trigger frame for random access to indicate resource units (RUs) for random access; and if an orthogonal frequency division multiple-access (OFDMA) backoff (OBO) is zero or decrements to zero, means for randomly selecting one RU of the RUs for random access, and if a virtual CS and a physical CS of the one RU indicates the one RU is idle, means for configuring the wireless device to transmit a physical (PHY) layer convergence procedure (PLCP) protocol data units (PPDU) on the one RU in accordance with OFDMA, if the virtual CS or the physical CS of the one RU indicates the one RU is busy, means for refraining from transmitting the PPDU.

In Example 62, the subject matter of Example 61 optionally includes the apparatus further comprising: if OBO is zero or decrements to zero, and the virtual CS or the physical CS of the one RU indicates the one RU is busy, means for randomly selecting a second RU of second RUs for random access indicated in a subsequent trigger frame.

In Example 63, the subject matter of any one or more of Examples 61-62 optionally include the apparatus further comprising: if OBO it not zero, means for resuming decrementing the OBO counter in a next trigger frame for random access.

In Example 64, the subject matter of any one or more of Examples 61-63 optionally include the apparatus further comprising wherein each of the RUs for random access are a same size.

In Example 65, the subject matter of any one or more of Examples 61-64 optionally include wherein the wireless device is one from the following group: an Institute of Electrical and Electronic Engineers (IEEE) 802.11ax access point, an IEEE 802.11ax station, an IEEE 802.11 station, and an IEEE 802.11 access point.

In Example 66, the subject matter of any one or more of Examples 61-65 optionally include means for processing radio wave; and, means for receiving and transmitting the radio waves coupled to the means for processing the radio waves.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high efficiency (HE) station (STA), the apparatus comprising:
   memory; and
   processing circuitry coupled to the memory, the processing circuity configured to:
   decode a trigger frame, the trigger frame to indicate resource units (RUs) for random access;
   in response to a determination that a value of an orthogonal frequency division multiple-access (OFDMA) backoff (OBO) counter is less than a number of the RUs indicated for random access, decrement the OBO counter to zero, otherwise decrement the OBO counter by the number of the RUs indicated for random access; and
   in response to a determination that the value of the OBO counter is zero, randomly select one of the RUs indicated for random access, and
      determine a virtual carrier sense (CS) based on one or more network allocation vectors (NAVs) to determine if the selected RU is idle, and perform a physical CS to determine if the selected RU is idle, wherein the physical CS is to be performed on a 20 MHz bandwidth that comprises the selected RU,
      in response to a determination that the virtual CS and the physical CS both indicate that the selected RU is idle, configure the HE STA to transmit a physical (PHY) layer convergence procedure (PLCP) protocol data unit (PPDU) in the selected RU, and
      in response to a determination that the virtual CS or the physical CS indicate that the selected RU is busy, refrain from transmitting the PPDU, and randomly select an RU indicated for random access in a subsequent trigger frame.

2. The apparatus of claim 1, wherein the processing circuitry is further configured to:
   decode a frame comprising a minimum OFDMA contention window (OCW) (OCWmin);
   set a value of an OCW to the OCWmin; and
   initialize the OBO counter to a random value in the range of 0 and OCWmin.

3. The apparatus of claim 1,
   wherein the processing circuitry is further configured to:
   after decrementing the OBO counter, in response to a determination that the value of the OBO counter is not zero, use the value of the OBO counter for a next trigger frame that indicates RUs for random access.

4. The apparatus of claim 1, wherein the performance of the physical CS is based on energy detection (ED).

5. The apparatus of claim 1, wherein the processing circuitry is further configured to:
   configure the HE STA to transmit the PPDU within/in the selected RU in accordance with one or both of OFDMA and multi-user multiple-input multiple-output (MU-MIMO).

6. The apparatus of claim 5, wherein the processing circuitry is further configured to:
   in response to a determination that the trigger frame is an initial transmission, randomly select a value for the OBO field from 0 to a minimum value of an OFDMA contention window (OCW) (OCWmin) field.

7. The apparatus of claim 1, wherein the trigger frame comprises a field that indicates that the trigger frame is a trigger frame for random access.

8. The apparatus of claim 1, wherein the trigger frame comprises a field that indicates virtual CS and the physical CS are to be performed before transmitting on the selected RU.

9. The apparatus of claim 1, wherein the HE STA comprises carrier sensing hardware to perform energy detect (ED) for each 20 MHz channel that comprises the RUs indicated for random access.

10. The apparatus of claim 1, wherein the HE STA is one from the following group: an Institute of Electrical and Electronic Engineers (IEEE) 802.11ax access point, an IEEE 802.11 ax station, an IEEE 802.11 station, and an IEEE 802.11 access point.

11. The apparatus of claim 1, further comprising transceiver circuitry coupled to the processing circuitry; and, one or more antennas coupled to the transceiver circuitry.

12. The apparatus of claim 1, wherein the selected RU is less than 20 MHz.

13. A non-transitory computer-readable storage medium that stores instructions for execution by one or more processors of a high-efficiency (HE) station (STA) (HE STA), the instructions to:
   decode a trigger frame, the trigger frame to indicate resource units (RUs) for random access;
   in response to a determination that a value of an orthogonal frequency division multiple-access (OFDMA) backoff (OBO) counter is less than a number of the RUs indicated for random access, decrement the OBO counter to zero, otherwise decrement the OBO counter by the number of the RUs indicated for random access; and
   in response to a determination that the value of the OBO counter is zero, randomly select one of the RUs indicated for random access, and
      determine a virtual carrier sense (CS) based on one or more network allocation vectors (NAVs) to determine if the selected RU is idle, and perform a physical CS to determine if the selected RU is idle, wherein the physical CS is to be performed on a 20 MHz bandwidth that comprises the selected RU,
      in response to a determination that the virtual CS and the physical CS both indicate that the selected RU is idle, configure the HE STA to transmit a physical (PHY) layer convergence procedure (PLCP) protocol data unit (PPDU) in the selected RU, and
      in response to a determination that the virtual CS or the physical CS indicate that the selected RU is busy, refrain from transmitting the PPDU, and randomly select an RU indicated for random access in a subsequent trigger frame.

14. The non-transitory computer-readable storage medium of claim 13, wherein the instructions are further to:
   decode a frame comprising a minimum OFDMA contention window (OCW) (OCWmin);
   set a value of an OCW to the OCWmin; and
   initialize the OBO counter to a random value in the range of 0 and OCWmin.

15. The non-transitory computer-readable storage medium of claim 13, wherein the instructions are further to:
   in response to a determination that the virtual CS or the physical CS indicate that the selected RU is busy, refrain from transmitting the PPDU, and randomly select an RU indicated for random access in a subsequent trigger frame.

16. The non-transitory computer-readable storage medium of claim 13, wherein the instructions are further to:
use the value of the OBO counter for a next trigger frame that indicates RUs for random access, if the value of the OBO counter is not zero.

17. The non-transitory computer-readable storage medium of claim 13, wherein the instructions further configure the one or more processors to cause the apparatus of the HE STA to:
perform the physical CS based on energy detection (ED).

18. A method performed by an apparatus of a high-efficiency (HE) station (STA) (HE STA), the method comprising:
decoding a trigger frame, the trigger frame to indicate resource units (RUs) for random access;
in response to a determination that a value of an orthogonal frequency division multiple-access (OFDMA) backoff (OBO) counter is less than a number of the RUs indicated for random access, decrementing the OBO counter to zero, otherwise decrementing the OBO counter by the number of the RUs indicated for random access; and
in response to a determination that the value of the OBO counter is zero, randomly selecting one of the RUs indicated for random access, and
determining a virtual carrier sense (CS) based on one or more network allocation vectors (NAVs) to determine if the selected RU is idle, and perform a physical CS to determine if the selected RU is idle, wherein the physical CS is to be performed on a 20 MHz bandwidth that comprises the selected RU,
in response to a determination that the virtual CS and the physical CS both indicate that the selected RU is idle, configuring the HE STA to transmit a physical (PHY) layer convergence procedure (PLCP) protocol data unit (PPDU) in the selected RU, and
in response to a determination that the virtual CS or the physical CS indicate that the selected RU is busy, refraining from transmitting the PPDU, and randomly select an RU indicated for random access in a subsequent trigger frame.

19. The method of claim 18, the method further comprising:
decoding a frame comprising a minimum OFDMA contention window (OCW) (OCWmin);
setting a value of an OCW to the OCWmin; and
initializing the OBO counter to a random value in the range of 0 and OCWmin.

* * * * *